(No Model.)
W. POSTMUS.
WOODWORKING MACHINE.
No. 591,424. Patented Oct. 12, 1897.
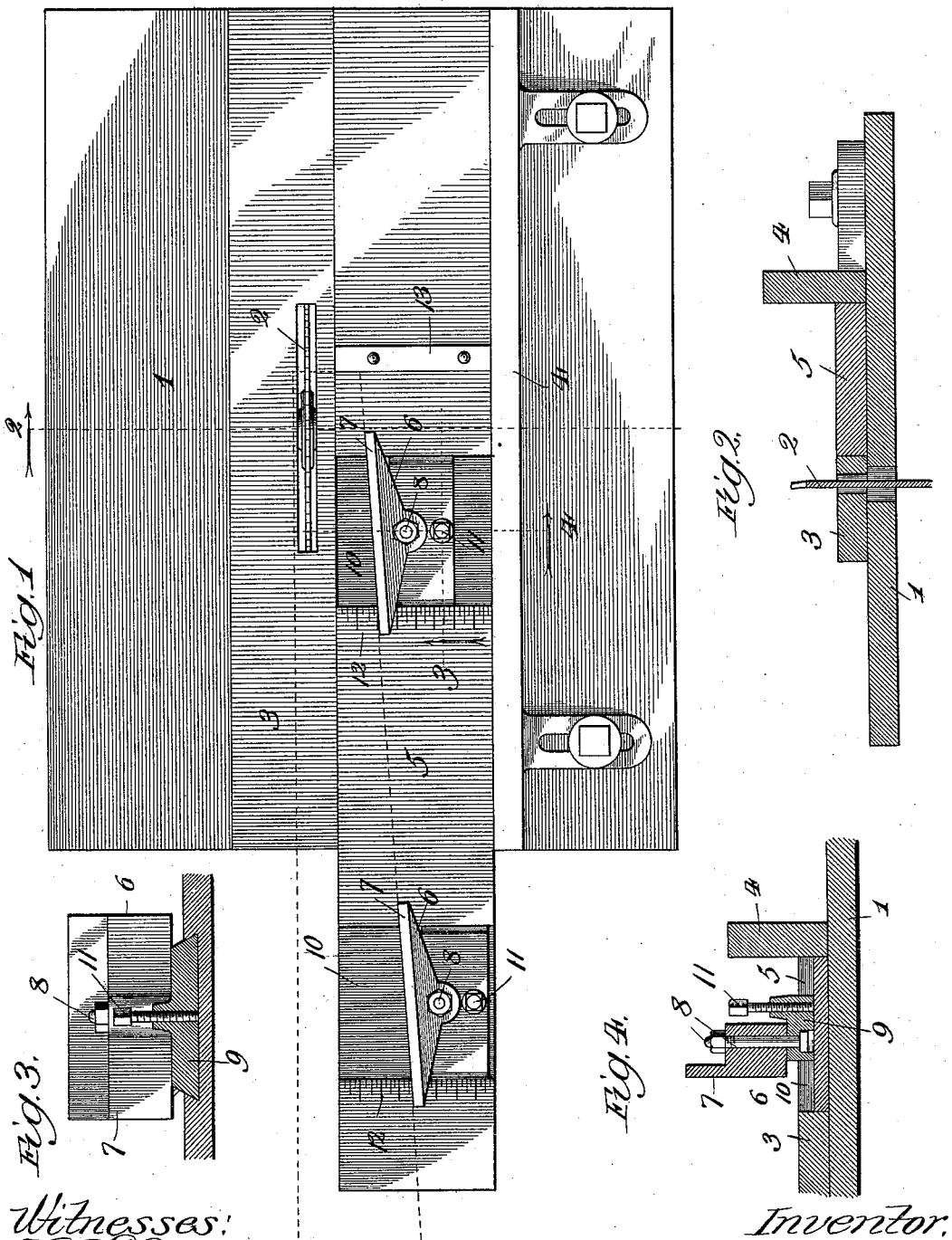
Witnesses:
Chas. E. Gaylord,
Lute J. Peters
Inventor,
Wieger Postmus,
By Samuel E. Hibben,
Atty's

UNITED STATES PATENT OFFICE.

WIEGER POSTMUS, OF CHICAGO, ILLINOIS.

WOODWORKING-MACHINE.

SPECIFICATION forming part of Letters Patent No. 591,424, dated October 12, 1897.

Application filed February 1, 1897. Serial No. 621,405. (No model.)

*To all whom it may concern:*

Be it known that I, WIEGER POSTMUS, residing at Chicago, Cook county, Illinois, have invented certain new and useful Improvements in Woodworking-Machines, of which the following is a specification.

My invention has relation to woodworking-machines; and its object is to provide a movable adjustable gage device which is adapted to act at all times as a straight edge for all kinds of work, whether warped, irregular, or otherwise.

Another main object is to provide for diagonal or oblique sawing or wedging without the use of the usual patterns, and to this end I employ, preferably, two blocks adjustable on a movable frame and adjustable in different planes with reference to each other. By means of such adjustment any degree of taper or wedge may be obtained, and the character of the edge of the work against the blocks, whether such edge is curved or not, is immaterial.

My invention is particularly applied to sawing-machines in wagon and carriage factories for the purpose of sawing and shaping poles, tongues, axles, &c.

Other novel and advantageous features will be apparent from the description hereinafter given.

In the accompanying drawings, Figure 1 is a plan view of a saw-table, showing my invention embodied; Figs. 2, 3, and 4, sections taken on lines 2, 3, and 4, respectively, of Fig. 1.

The table 1 and saw 2 are arranged as usual, except that the saw is preferably caused to project through a raised portion of the table, or a strip 3 secured thereto. Upon the table is also arranged a gage-plate 4, which may be adjustable or not, as desired, toward or away from the saw. The gage 4 and strip 3 thus form a channel or guide adapted to accommodate a movable strip or frame 5, which constitutes the platform or device on which the work is fed to the saw. It is obvious that any other means, such as a rabbet device, on the movable frame and table may be adopted in order to guide the frame and keep it from the saw instead of using the raised strip shown. Located upon this frame or strip 5 are two similar head-blocks 6, which together form a straight-edge device. These blocks are similar in construction and a description of one will apply to both. As shown in Figs. 3 and 4, each one consists of a block portion 7, which is loosely pivoted upon a pin 8, secured in a base-piece 9. The latter piece or base preferably has two of its edges oppositely beveled, as shown in Fig. 3, and adapted to fit in corresponding dovetail grooves 10, extending transverse of the movable frame. In order to hold the base and block in a predetermined position upon the frame, I provide a thumb-screw or a set-screw 11, engaging the frame. The frame 5 preferably has two scales 12, marked upon its top and running transverse and adjacent to the movable blocks, so that the latter may be set to the same gage or relative position, or so set as that the straight edge may have a certain taper or wedge. At the forward end of the frame a suitable block or cleat 13 is secured, against which the work is designed to abut.

My device operates as follows: The blocks are first adjusted with respect to each other to obtain the desired angle or general line for that edge of the board farthest from the saw and secured in such predetermined positions by the set-screws 11. The blocks 7 proper being loosely mounted or swiveled adapt themselves to any angle and contact the board or work at two points, forming a straight-edge device regardless of any curve, irregularity, or warp upon the edge of the board. Furthermore, by shifting the blocks with respect to each other any desired oblique cut or wedge may be obtained and the same angle of cut may be secured for any number of boards or other work. My device consequently forms a pattern which is adjustable and travels with the work, whereby any desired angle or cut may be secured. A certain angle for the straight edge may be obtained by using the scales, the blocks being properly shifted relative to each other. The board or other work abuts the end block or cleat 13, and is fed to the saw, either by hand or automatically, in the usual and well-known manner. Heretofore it has been customary to use solid patterns between such a gage, as 4, and the work which was fed to the saw in order to obtain the proper oblique cut or wedge. Furthermore, a board or timber warped or crooked upon its edges could not be properly sawed. By my invention these objections are obviated and any kind and shape of timber may be worked up. Furthermore, all liability of the cracking and burning of the saw caused by warped or crooked lumber is avoided.

Although I have described more or less precise forms and details of construction, I do not intend to be understood as limiting myself thereto, as I contemplate changes in form, the proportion of parts, and the substitution of equivalents as circumstances may suggest or render expedient and without departing from the spirit of my invention.

I claim—

1. In woodworking-machines, the combination, with a saw-table and a saw, of a frame movable upon the table and adapted to carry the work and blocks having straight edges or faces and adjustable transverse on the frame and at right angles to the saw, such blocks being located on the same side of the saw and loosely pivoted to adapt the straight edges to the work presented.

2. In woodworking-machines, the combination with a saw-table and a saw, of a frame movable upon the table, blocks working upon the frame and adjustable thereon transverse to the frame and with respect to each other, such blocks being loosely pivoted and having straight edges which assume their position after the work is placed on the frame.

3. In woodworking-machines, the combination, with a saw-table and saw, loosely-swiveled blocks adjustable toward and away from the saw and into the same or different planes with respect to each other and having faces which form straight edges when the work is placed on the table and in contact with the blocks.

4. In woodworking-machines, the combination of a saw-table, a saw, a straight strip parallel to the saw, a gage parallel to the strip and forming a guide or channel together with the strip, a frame movable in the guide, and swiveled blocks mounted upon the frame and independently adjustable thereon.

5. In woodworking-machines, the combination of a saw-table, a saw, a frame movable thereon, blocks, base-pieces upon which the blocks are swiveled, the frame having transverse grooves in which the base-pieces are adapted to slide and means for securing the base-pieces in predetermined positions upon the frame.

6. In woodworking-machines, the combination of a saw-table, a saw, a frame 5 movable thereon, base-pieces 9, blocks 7 pivoted upon the base-pieces, the frame having transverse grooves in which the base-pieces are adapted to slide and set-screws 11 for securing the blocks and base-pieces in predetermined positions on the movable frame.

7. In woodworking-machines, the combination of a saw-table, a raised strip 3 thereon parallel to the saw, a gage 4 forming a guide with the parallel strip, a frame 5 movable in the guide and having transverse guides 10, a cleat 13 at its forward end, and adjustable block devices comprising base portions 9 movable in said guides, blocks 7 pivoted upon the base portions and set-screws 11 for holding the block devices in predetermined positions upon the movable frame.

8. In woodworking-machines, the combination of a saw-table 1, saw 2, a raised strip 3 thereon parallel to the saw, a gage 4 upon the table forming a channel or guide with the strip 3, a flat piece or frame 5 slidable on the table in said channel or guide, and an adjustable straight-edge device comprising two blocks, 7, base portions 9, the frame 5 having transverse grooves in which the base portions 9 slide, pins 8 passing through the base portions and the blocks whereby the latter are pivotally mounted on the former and a set-screw 11 for holding the blocks and base portions in predetermined positions transverse of the frame 5, the blocks capable of adjustment independent of each other to form a straight edge oblique to the saw.

WIEGER POSTMUS.

Witnesses:
P. SPOOLSTRA,
L. POSTMUS.